INVENTOR
Julius Liebel
BY Bailey, Stephens & Huettig
ATTORNEYS

INVENTOR
Julius Liebel
BY Bailey, Stephens & Huettig
ATTORNEYS

United States Patent Office 3,292,600
Patented Dec. 20, 1966

3,292,600
ROTARY PISTON ENGINE
Julius Liebel, Nurnberg, Germany, assignor to Maschinenfabrik Augsburg-Nurnberg A.G., Nurnberg, Germany
Filed Apr. 20, 1961, Ser. No. 104,290
Claims priority, application Germany, Apr. 27, 1960, M 45,129
6 Claims. (Cl. 123—8)

This invention is directed to a rotary piston internal combustion engine.

The rotary piston engine of this invention has a stationary housing enclosing a piston space with flat side walls. The piston space has the outline of the figure 8 between the side walls. A piston having the shape of an equilateral circular arc triangle is rotatably mounted within this trochoidal shaped piston space. The rotary piston moves with its pointed corners always on the curved outline of the piston space and thus divides the space which is not entirely filled by the piston into three chambers and within which the four-cycle fuel combustion process is ignited. As the rotary piston moves in the piston space, it forces the volume in the chambers to increase and decrease, respectively. Also, each side edge of the piston is provided with a fuel and air flow chamber which becomes active when the flow chamber produces communication between two partial chambers formed at the saddle point of the curved outline of the piston cavity.

The object of this invention is to utilize a type of motor which was designed to operate according to the Otto-process under fuel combustion methods which are different from its use in the Otto-process.

According to this invention, the quality regulated work method is used in such a manner that the liquid fuel is injected under pressure at least into the air and fuel flow chamber and/or into one or both of the partial chambers. This produces a very favorable preparation of the fuel because the compressed air, after the saddle point has been passed by the corner of the piston during one piston stroke, can flow in an unimpeded even stream from one partial chamber to the other in the form of a stream which is favorable for the mixing of the fuel with the air and the like.

The fuel and air flow chamber is formed in such a manner that a strongly controlled air stream is created when communication is established between the two partial chambers. Preferably, the fuel is injected in the direction of the flow of the gas stream created in the flow chamber by the rotation of the piston. Advantageously, the fuel is spread free of deflection as a film on the wall of the flow chamber, vaporized therefrom, mixed with the air and then burned. Consequently, the flow chamber is given a relatively small surface area to facilitate the preparation of the fuel. For such reason, a substantially spherical combustion chamber as is used in reciprocating engines or in any similar curved shape can be used for the combustion chamber. In a modified form, the combustion chamber can be of arcuate shape or in the form of a shallow basin. A further modification lies in shaping the combustion chamber as a spiral, with the inlet and outlet ports of the chamber being directed tangentially to the surface of the piston.

The means by which the objects of the invention are obtained are described more fully with reference to the accompanying drawings, in which.

Figure 1:
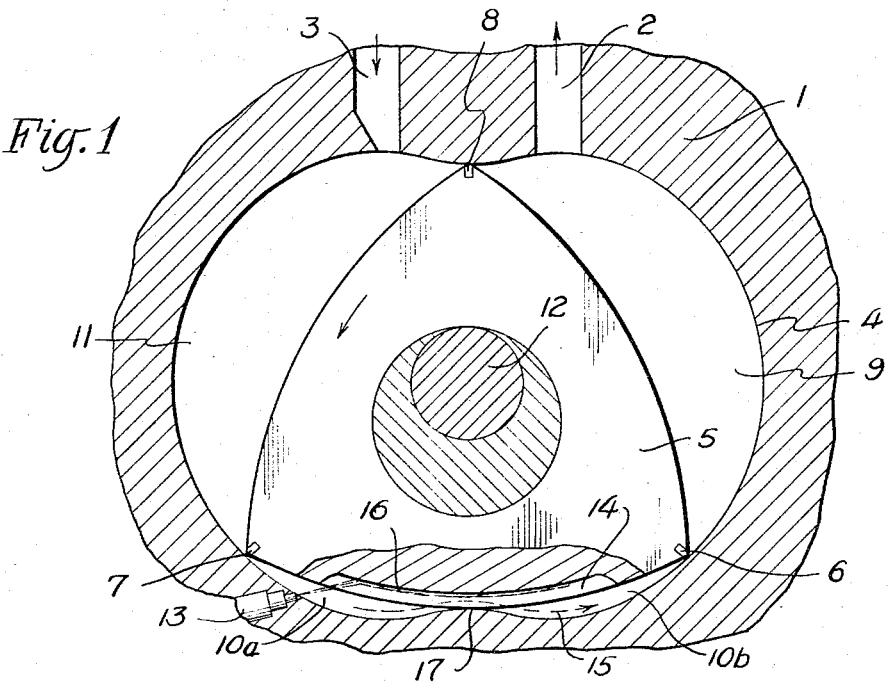
FIGURE 1 is a diagrammatic sectional view of a rotary piston engine having a long and substantially straight air and fuel flow chamber.

As shown in FIGURE 1, the stationary housing 1 of the rotary piston engine has an exhaust gas port 2 and an intake air port 3. The piston space 4 has the outline of a figure 8 in the form of a trochoid and is closed in by flat side walls, not specifically shown. Rotary piston 5 is mounted to rotate in this piston space, and the piston has the shape of an equilateral arc triangle. The corners or the sealing edges 6, 7 and 8 of piston 5 bear on the trochoidal periphery of the piston space 4. This shape of the piston divides the piston space into three chambers 9, 10a and 10b, and 11 in which the four-cycle combustion process takes place. Rotary piston 5 is mounted eccentric to the crank shaft 12 so that the piston has a combined movement around two different axes in order to conform to the trochoidal shape of the piston space. Fuel injection nozzle 13 ejects the fuel into the elongated air and fuel flow or combusion chamber 14 in the direction of the air stream 15 and as a film 16 on the wall of the flow chamber. The saddle point 17 of the trochoidal shaped piston space 4 subdivides the compression chamber into the two partial chambers 10a and 10b. Communication is established between these two partial chambers only so long as they are connected through the flow chamber. It is not absolutely necessary that the fuel be applied directly onto the wall of the flow chamber by directing the fuel in the direction of the air stream 15 and tangentially and undeflected by the wall. Instead, the fuel can be sprayed into the air flowing by the fuel nozzle by means of which the stream of air carries the fuel to coat the wall of the flow chamber. Moreover, when intake port 3 is opened by the passing of the edge 6 of the piston, combustion air is drawn into the chamber 11 until port 3 is closed by the piston edge 7. Further rotation of the piston forces the air into the partial chambers 10a and 10b where the combustion is started, as indicated. The exhaust gases are discharged through the port 2 after the edge 6 has passed across port 2.

Figure 2:
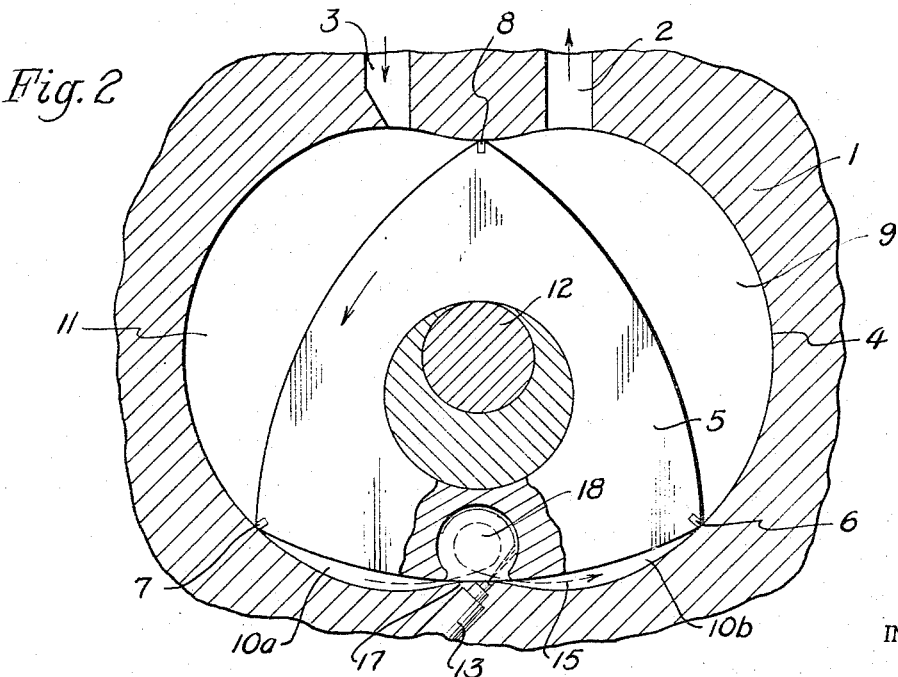
FIGURE 2 is a view similar to FIGURE 1 showing a modified flow chamber in a substantially hollow spherical shape.

FIGURE 2 is similar to FIGURE 1 except that the flow chamber 18 has a substantially spherical form. It has a constricted opening through the surface of the piston. As soon as the edge of the chamber 18 passes over the saddle point 17, the air flows through chamber 18 in the direction indicated by the arrow 15 and the fuel is simultaneously injected into the chamber. Thus again by orienting nozzle 13, the fuel can be injected onto the wall of the chamber 18 in the form of a film, vaporized, mixed with air, and burned according to the process disclosed in Meurer Patent No. 2,907,308. Chamber 18 must be constructed so that the air can pass from partial chamber 10a into partial chamber 10b in one motion.

Figure 3:
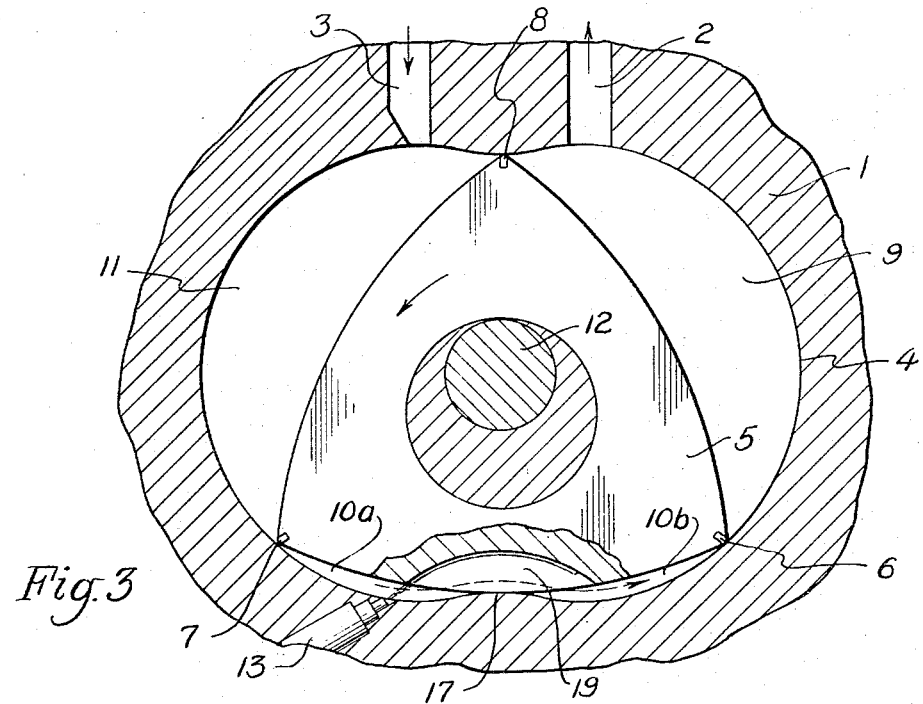
FIGURE 3 is a view similar to FIGURE 1 showing a modification in which the flow chamber is in the form of an arc or a shallow basin.

In FIGURE 3, the combustion chamber 19 has the shape of an arc or a shallow bowl. Otherwise the chamber 19 functions as described for the chambers in FIGURES 1 and 2.

Figure 4:
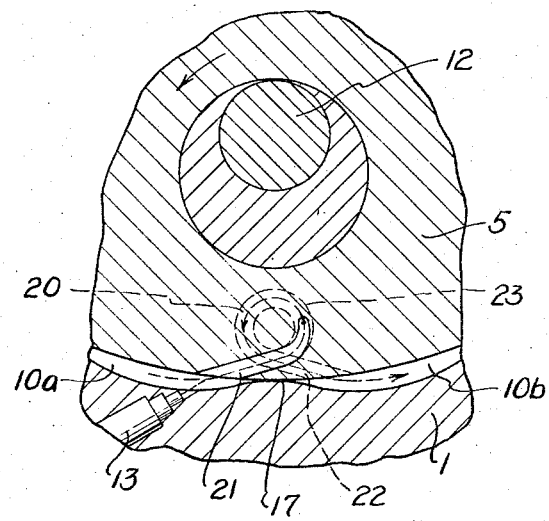
FIGURE 4 is a partial view similar to FIGURE 1 but showing a spiral flow chamber.

As shown in FIGURE 4, the chamber 20 has the form of a spiral and the ports to the inlet entrance 21 and the outlet port to the discharge channel 22 are directed substantially tangentially to the surface of the piston. The air enters chamber 20 through channel 21 during the compression stroke so that an air swirl is created therein as indicated by the arrow 23 and which air swirl is discharged through outlet channel 22 and into partial chamber 10b.

Having now described the means by which the objects of the invention are obtained,

I claim:
1. In a rotary piston internal combustion engine having a stationary housing enclosing a trochoidal shaped piston space with curved walls forming saddle points, a piston mounted for eccentric rotation in said piston space, said piston having a plurality of corners which constantly bear on said walls for forming working chambers between each adjacent pair of corners, the volume of each working chamber being constantly changed as said piston rotates, and inlet and exhaust ports in said housing for effecting a change of gas in the working chambers, the improvement comprising a combustion chamber in the working face of said piston between each pair of adjacent corners, respectively, and nozzle means mounted in said housing for injecting liquid fuel as a jet of fuel into each combustion chamber in the general direction of the air flow in the chamber as the chamber is rotated by said piston across a saddle point located at the compressed air end of the intake combustion air compression working chamber.

2. In an engine as in claim 1, said nozzle means being oriented to inject the liquid fuel into the leading part of said combustion chamber as it is rotated across the saddle point.

3. In an engine as in claim 1, said nozzle being oriented to inject the liquid fuel into the combustion chamber simultaneously with the beginning of flow of compressed air through said chamber as it is rotated across the saddle point.

4. In an engine as in claim 3, said chamber further having a circular disc shape.

5. In an engine as in claim 1, said combustion chamber having a spiral shape with inlet and outlet ports directed substantially tangentially of the working face of the piston.

6. In an engine as in claim 1, said nozzle means being oriented to inject fuel tangentially as a film on the wall of said combustion chamber, said fuel then being vaporized from said wall, mixed with gas flowing through said combustion chamber, and finally burned.

References Cited by the Examiner
UNITED STATES PATENTS

| | | | |
|---|---|---|---|
| 813,018 | 2/1906 | Okun | 123—8 |
| 1,633,541 | 6/1927 | Braren | 123—30.21 |
| 2,027,972 | 1/1936 | Haller et al. | 123—8 |
| 2,050,603 | 8/1936 | Gardner | 123—8 |
| 2,283,433 | 5/1942 | Gross | 123—8 |
| 2,907,308 | 10/1959 | Meurer et al. | 123—30.21 |
| 2,988,065 | 6/1961 | Wenkel et al. | 123—8 |
| 3,053,238 | 9/1962 | Meurer | 123—8 |

OTHER REFERENCES

Wankel et al.: Bauart und Gegenwartigic Entwecklungstand Einer Trochoiden-Rotationskolbenmaschine, pp. 33–45, Feb. 2, 1960.

Rotary- and Epicyclic-Piston Engines, in the Oil Engine and Gas Turbine, pp. 306–310, March 1960.

MARK NEWMAN, *Primary Examiner.*

K. J. ALBRECHT, JOSEPH H. BRANSON, Jr.,
*Examiners.*

F. T. SADLER, *Assistant Examiner.*